United States Patent
Horiuchi et al.

(10) Patent No.: US 10,983,228 B2
(45) Date of Patent: Apr. 20, 2021

(54) RADIOGRAPHIC IMAGE CAPTURING APPARATUS AND HEAT DIFFUSION METHOD

(71) Applicant: FUJIFILM Corporation, Tokyo (JP)

(72) Inventors: Hisatsugu Horiuchi, Kanagawa (JP); Shinichi Kano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 305 days.

(21) Appl. No.: 15/801,330

(22) Filed: Nov. 2, 2017

(65) Prior Publication Data

US 2018/0136345 A1 May 17, 2018

(30) Foreign Application Priority Data

Nov. 15, 2016 (JP) .............................. JP2016-222692

(51) Int. Cl.
*G01T 1/24* (2006.01)
*G01T 7/00* (2006.01)
*G01T 1/29* (2006.01)

(52) U.S. Cl.
CPC .............. *G01T 1/244* (2013.01); *G01T 1/247* (2013.01); *G01T 1/2928* (2013.01); *G01T 7/00* (2013.01); *G01T 7/005* (2013.01)

(58) Field of Classification Search
None
See application file for complete search history.

(56) References Cited

U.S. PATENT DOCUMENTS

| 6,206,566 B1 * | 3/2001 | Schuetz | A61B 6/547 378/205 |
| 2007/0284535 A1 * | 12/2007 | Heismann | A61B 6/035 250/370.15 |

(Continued)

FOREIGN PATENT DOCUMENTS

| JP | 2007-319670 A | 12/2007 |
| JP | 2009-072424 A | 4/2009 |

(Continued)

OTHER PUBLICATIONS

English language translation of the following: Office action dated Jan. 7, 2020 from the JPO in a Japanese patent application No. 2016-222692 corresponding to the instant patent application. This office action translation is submitted now in order to supplement the understanding of the cited references which are being disclosed in the instant Information Disclosure Statement.

(Continued)

*Primary Examiner* — Edwin C Gunberg
(74) *Attorney, Agent, or Firm* — Solaris Intellectual Property Group, PLLC

(57) ABSTRACT

A radiographic image capturing apparatus includes: a radiation detector in which a plurality of pixels for accumulating electric charges corresponding to emitted radiation are arranged in a two-dimensional manner; a control unit that controls the radiation detector; a radiation emission unit that emits radiation; a changing unit that integrally changes angles of the radiation detector and the control unit with respect to a predetermined direction; a heat sink in which a guiding unit for guiding an air flow in a predetermined guiding direction is provided and which dissipates heat of the control unit; and a housing unit in which the radiation detector, the control unit, and the heat sink are housed and (Continued)

which has a radiation detection surface irradiated with the radiation emitted from the radiation emission unit.

10 Claims, 8 Drawing Sheets

(56) References Cited

U.S. PATENT DOCUMENTS

| | | |
|---|---|---|
| 2009/0080620 A1 | 3/2009 | Miyako et al. |
| 2010/0054419 A1 | 3/2010 | Watanabe |
| 2010/0243894 A1* | 9/2010 | Kato ............................ G01T 7/00 250/336.1 |
| 2012/0104271 A1 | 5/2012 | Gonda |
| 2015/0010131 A1 | 1/2015 | Arisaka et al. |

FOREIGN PATENT DOCUMENTS

| | | |
|---|---|---|
| JP | 2010-057596 A | 3/2010 |
| JP | 2010-237543 A | 10/2010 |
| JP | 2011-069992 A | 4/2011 |
| JP | 2012-095708 A | 5/2012 |
| JP | 2014-166263 A | 9/2014 |
| WO | 2013/129449 A1 | 9/2013 |

OTHER PUBLICATIONS

English language translation of the following: Office action dated Apr. 28, 2020 from the JPO in a Japanese patent application No. 2016-222692 corresponding to the instant patent application.

* cited by examiner

RADIOGRAPHIC IMAGE CAPTURING APPARATUS AND HEAT DIFFUSION METHOD

CROSS-REFERENCE TO RELATED APPLICATION

This application is based on and claims priority under 35 USC 119 from Japanese Patent Application No. 2016-222692 filed on Nov. 15, 2016, the disclosure of which is incorporated by reference herein.

BACKGROUND

Technical Field

The present disclosure relates to a radiographic image capturing apparatus and a heat diffusion method.

Related Art

A radiographic image capturing apparatus is known that captures a radiographic image by detecting a radiation, which is transmitted through a subject after being emitted from a radiation emission device, with a radiation detector.

In the radiographic image capturing apparatus, an electronic circuit functioning as a control unit for driving the radiation detector, the radiation detector, and the like are provided inside a housing unit. In the radiographic image capturing apparatus, there is a case where an electronic circuit or the like generates heat.

For this reason, for example, JP2007-319670A discloses a technique for cooling a radiation detector with cooling air flow.

Incidentally, as the radiation detector, a radiation detector in which a plurality of pixels are arranged in a two-dimensional manner is known. In the radiation detector, temperature unevenness (temperature gradient) may occur in a plurality of pixels arranged in a two-dimensional manner due to heat inside a housing unit.

However, although the known technique is a technique for cooling the radiation detector, there are cases in which it is not always sufficient to improve the temperature unevenness of the radiation detector.

SUMMARY

The present disclosure has been made in view of the above circumstances, and it is an object of the present disclosure to provide a radiographic image capturing apparatus and a heat diffusion method capable of improving the temperature unevenness of a radiation detector.

In order to achieve the aforementioned object, a radiographic image capturing apparatus of the present disclosure comprises: a radiation detector in which a plurality of pixels for accumulating electric charges corresponding to emitted radiation are arranged in a two-dimensional manner; a control unit that controls the radiation detector; a radiation emission unit that emits radiation; a changing unit that integrally changes angles of the radiation detector and the control unit with respect to a predetermined direction; a heat sink in which a guiding unit for guiding an air flow in a predetermined guiding direction is provided and which dissipates heat of the control unit; and a housing unit in which the radiation detector, the control unit, and the heat sink are housed and which has a radiation detection surface irradiated with the radiation emitted from the radiation emission unit.

The radiographic image capturing apparatus of the present disclosure may further comprise a heat dissipation assisting unit that assists heat dissipation of the heat sink, and the predetermined guiding direction may be a heat dissipation direction set in advance according to the heat dissipation assisting unit.

The heat dissipation assisting unit of the radiographic image capturing apparatus of the present disclosure may include an air blower that blows inside air from an inside of the housing unit to the guiding unit.

The heat dissipation assisting unit of the radiographic image capturing apparatus of the present disclosure may include an air vent provided in the housing unit, and the predetermined guiding direction may be a direction toward the air vent.

The changing unit of the radiographic image capturing apparatus of the present disclosure may include a support unit for supporting the radiation emission unit at a position facing the radiation detection surface.

The changing unit of the radiographic image capturing apparatus of the present disclosure may include a support unit, which supports the radiation emission unit and has a hollow portion forming a space continuous with an inside of the housing unit through the air vent, at a position facing the radiation detection surface.

The radiographic image capturing apparatus of the present disclosure may further comprise a low heat conduction member that is provided between the radiation detector and the control unit and has a lower heat conductivity than a predetermined heat conductivity.

The radiographic image capturing apparatus of the present disclosure may further comprise a heat diffusion member that is provided in vicinity of the low heat conduction member to diffuse heat of the low heat conduction member.

The heat diffusion member of the radiographic image capturing apparatus of the present disclosure may be a member having a higher heat conductivity than the low heat conduction member.

The guiding unit of the radiographic image capturing apparatus of the present disclosure may be a plurality of fins aligned with a gap of 1.3 mm or more and 4.0 mm or less.

The control unit of the radiographic image capturing apparatus of the present disclosure may acquire an image signal by reading out electric charges accumulated in each of the plurality of pixels from each of the plurality of pixels in a state in which radiation is emitted from the radiation emission unit, acquire offset data by reading out electric charges accumulated in each of the plurality of pixels from each of the plurality of pixels in a state in which no radiation is emitted from the radiation emission unit, and perform correction processing for correcting the image signal with the offset data.

In order to achieve the aforementioned object, a heat diffusion method of the present disclosure is a heat diffusion method of a radiographic image capturing apparatus comprising a radiation detector in which a plurality of pixels for accumulating electric charges corresponding to emitted radiation are arranged in a two-dimensional manner, a control unit that controls the radiation detector, a radiation emission unit that emits radiation, a change unit that integrally changes angles of the radiation detector and the control unit with respect to a predetermined direction, and a housing unit in which the radiation detector, the control unit, and a heat sink are housed and which has a radiation detection surface irradiated with the radiation emitted from the radiation emission unit. The heat diffusion method comprises dissipating heat of the control unit by guiding an air flow in a predetermined guiding direction using a guiding unit provided in the heat sink such that the heat is diffused.

According to the present disclosure, it is possible to reduce the temperature unevenness of the radiation detector.

DETAILED DESCRIPTION

Hereinafter, an embodiment of the invention will be described in detail with reference to the accompanying diagrams.

Figure 1:
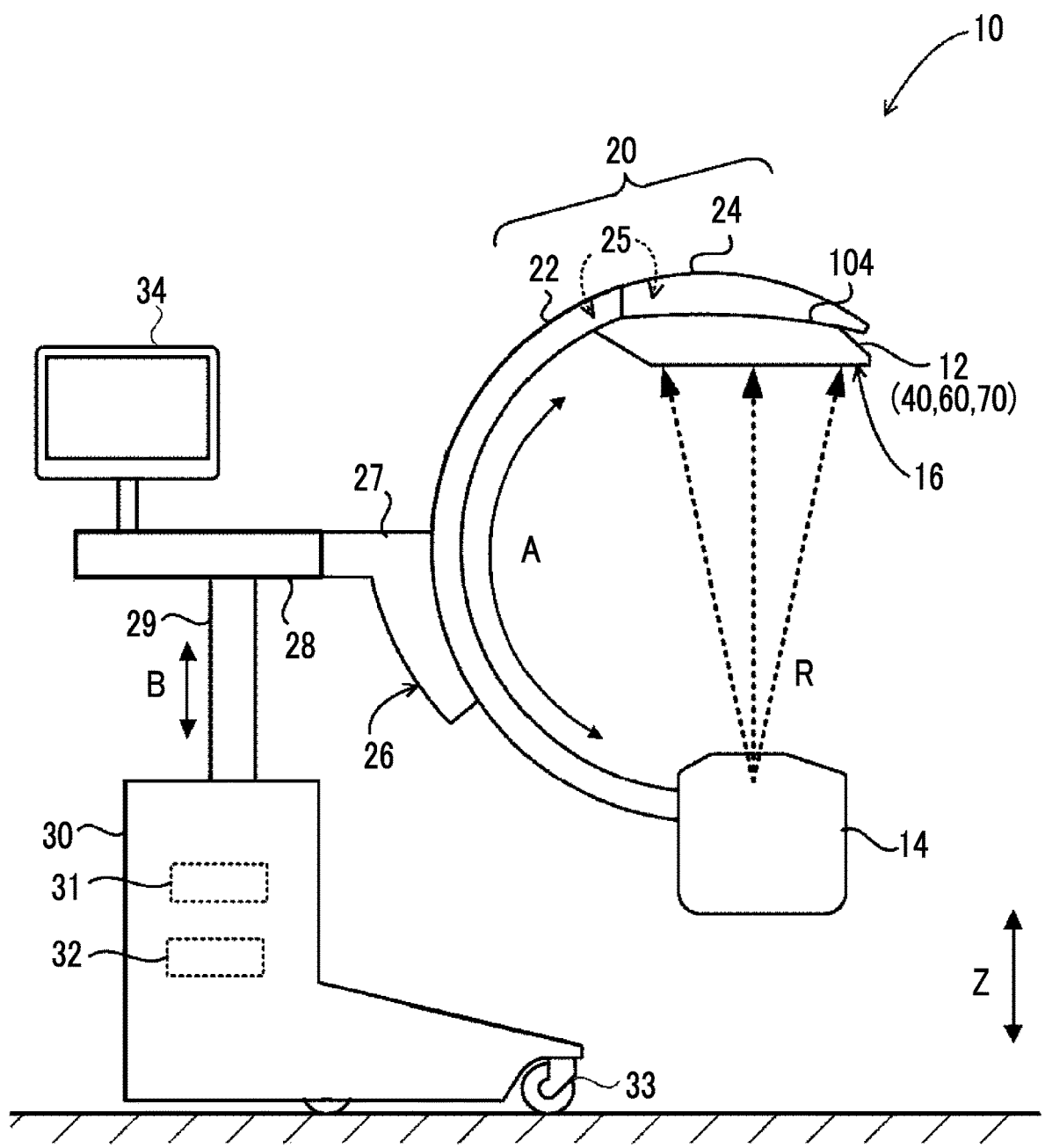
FIG. 1 is a side view showing an example of the configuration of a radiographic image capturing apparatus according to an embodiment.

First, the configuration of a radiographic image capturing apparatus 10 of the present embodiment will be described with reference to FIG. 1. As shown in FIG. 1, the radiographic image capturing apparatus 10 of the present embodiment includes a C arm 20 having an arm unit 22 and a holding unit 24.

A radiation emission unit 14 that emits a radiation R is provided at one end of the arm unit 22, and the holding unit 24 is provided at the other end. In the present embodiment, as shown in FIG. 1, the holding unit 24 holds a housing unit 12 in which a radiation detector 40 that detects the radiation R to generate image data indicating a radiographic image, a control unit 60 that controls the radiation detector 40, and the like, which will be described later, are housed.

The C arm 20 of the present embodiment has a function of integrally changing the angles of the radiation detector 40 and the control unit 60 with respect to an arrow Z direction (vertical direction) shown in FIG. 1. In the present embodiment, the arrow Z direction shown in FIG. 1 is an example of a predetermined direction of the disclosed technology, and the C arm 20 of the present embodiment is an example of a changing unit and a support unit of the disclosed technology.

A radiation detection surface 16 irradiated with the radiation R emitted from the radiation emission unit 14 is provided on a side of the housing unit 12 facing the radiation emission unit 14. In the radiographic image capturing apparatus 10 of the present embodiment, a so-called source image distance (SID) that is the distance between the radiation detection surface 16 and a radiation source (not shown) of the radiation emission unit 14 is set as a fixed value.

Inside the C arm 20 of the radiographic image capturing apparatus 10 of the present embodiment, a hollow portion 25 is provided across the arm unit 22 and the holding unit 24.

The C arm 20 is held so as to be movable in an arrow A direction shown in FIG. 1 by a C arm holding unit 26. The C arm holding unit 26 has a shaft portion 27, and the shaft portion 27 connects the C arm 20 to a bearing 28. The C arm 20 is rotatable with the shaft portion 27 as a rotation axis.

As shown in FIG. 1, the radiographic image capturing apparatus 10 of the present embodiment includes a main body unit 30 having a plurality of wheels 33 in a bottom portion thereof. A spindle 29 that extends and contracts in the Z-axis direction in FIG. 1 is provided on the upper portion side in FIG. 1 of the housing of the main body unit 30. The bearing 28 is held on the spindle 29 so as to be movable in an arrow B direction.

An interface (I/F) unit 31 and a radiation source control unit 32 are built into the main body unit 30.

The I/F unit 31 has a function of communicating with a console (not shown), which performs overall control relevant to radiographic image capturing of the radiographic image capturing apparatus 10, wirelessly or by cable. The radiographic image capturing apparatus 10 of the present embodiment captures a radiographic image based on an imaging instruction received from the console through the I/F unit 31.

The radiation source control unit 32 causes a radiation source (not shown) provided in the radiation emission unit 14 to emit the radiation R based on the exposure conditions included in the imaging instruction. As an example, the radiation source control unit 32 of the present embodiment is realized by a microcomputer including a central processing unit (CPU), a memory including a read only memory (ROM) and a random access memory (RAM), and a non-volatile storage unit such as a flash memory.

A user interface 34 is provided on the main body unit 30. The user interface 34 has a function of allowing a user, such as an operator or a doctor who captures a radiographic image using the radiographic image capturing apparatus 10, to give an instruction regarding the capturing of a radiographic image and a function of providing information regarding the capturing of a radiographic image to the user. As an example of the user interface 34, a touch panel display or the like can be mentioned.

Figure 2:
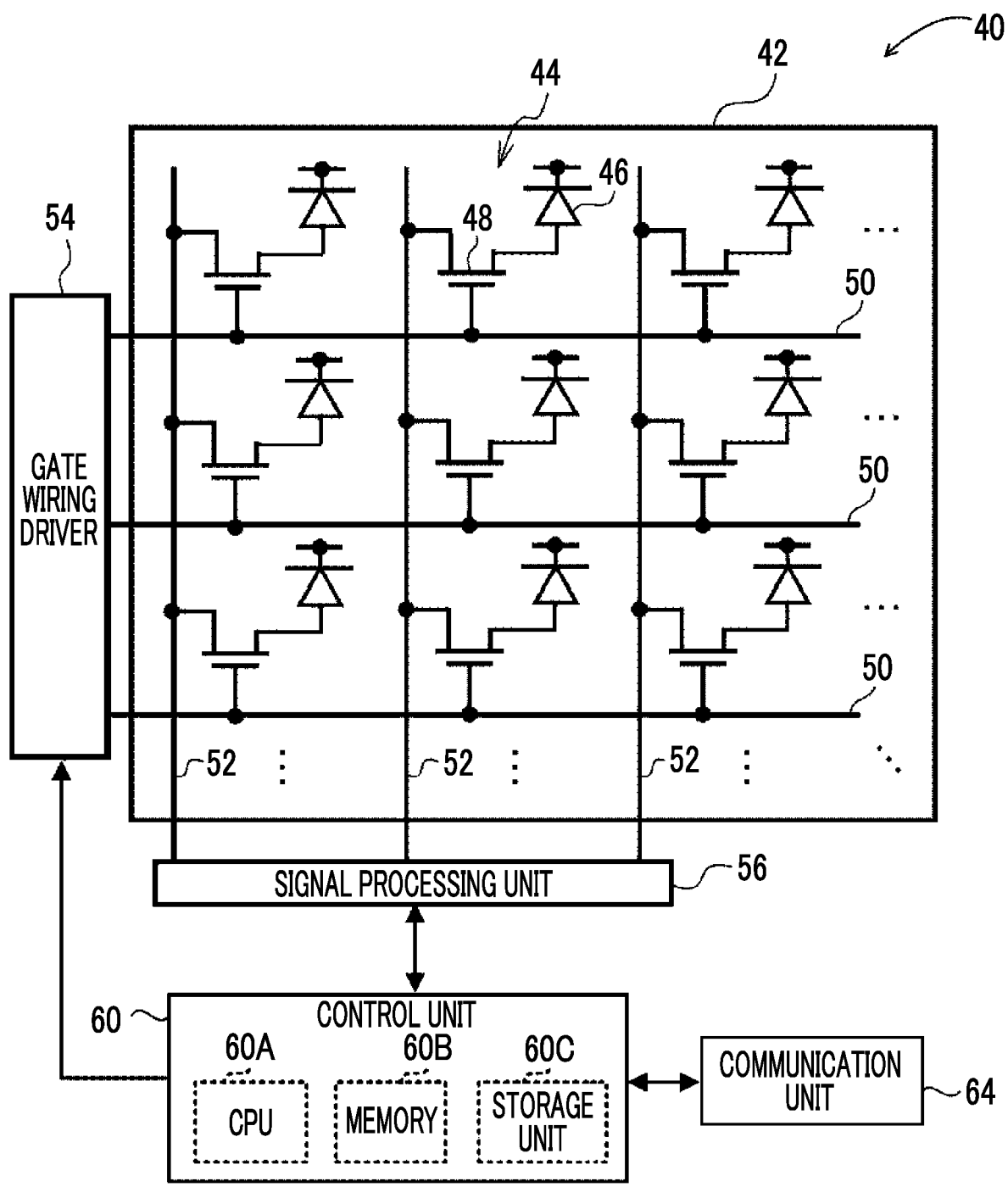
FIG. 2 is a block diagram (partial circuit diagram) showing an example of the configuration of main portions of an electrical system of a radiation detector and a control unit in the embodiment.

Next, the configuration of main portions of the electrical system of the radiation detector 40 and the control unit 60 housed in the housing unit 12 will be described with reference to FIG. 2. As shown in FIG. 2, the radiation detector 40 of the present embodiment includes a thin film transistor (TFT) substrate 42, a gate wiring driver 54, and a signal processing unit 56.

On the TFT substrate 42, a plurality of pixels 44 are provided in a two-dimensional shape in one direction (row direction in FIG. 2) and an intersection direction (column direction in FIG. 2) crossing the one direction. Each pixel 44 includes a sensor section 46 and a field effect thin film transistor (TFT; hereinafter, simply referred to as a "thin film transistor") 48.

The sensor section 46 includes an upper electrode, a lower electrode, a photoelectric conversion film, and the like (not shown). The sensor section 46 detects visible light converted from the radiation R by a scintillator (not shown), generates electric charges, and accumulates the generated electric charges. The amount of electric charges generated by the sensor section 46 increases as the amount of detected visible light increases. The thin film transistor 48 reads out the electric charges accumulated in the sensor section 46 according to a control signal, and outputs the electric charges.

On the TFT substrate 42, a plurality of gate wirings 50 arranged in the one direction for switching between on and off states of each thin film transistor 48 are provided. On the TFT substrate 42, a plurality of data wirings 52, which are arranged in the intersection direction and through which electric charges read out by the on-state thin film transistor 48 are output.

Each gate wiring 50 of the TFT substrate 42 is connected to the gate wiring driver 54, and each data wiring 52 of the TFT substrate 42 is connected to the signal processing unit 56.

The thin film transistors 48 of the TFT substrate 42 are sequentially turned on for each gate wiring 50 (in the present embodiment, in units of rows shown in FIG. 2) by a control signal supplied from the gate wiring driver 54 through the gate wiring 50. Then, the electric charges read out by the thin film transistor 48 that is turned on are transmitted as an electric signal through the data wiring 52 and are input to the signal processing unit 56. As a result, the electric charges are sequentially read out for each gate wiring 50 (in the present embodiment, in units of rows shown in FIG. 2), and image data indicating a two-dimensional radiographic image is acquired.

The signal processing unit 56 includes an amplifier circuit for amplifying the input electric signal and a sample and hold circuit (both not shown) for each data wiring 52. The electric signal transmitted through each data wiring 52 is amplified by the amplifier circuit and is then held in the sample and hold circuit. A multiplexer and an analog/digital (A/D) converter (both not shown) are sequentially connected to the output side of the sample and hold circuit. Then, electric signals held in the individual sample and hold circuits are sequentially (serially) input to the multiplexer. The electric signals sequentially selected by the multiplexer are converted into digital image data by the A/D converter, and are output to the control unit 60.

The control unit 60 includes a central processing unit (CPU) 60A, a memory 60B including a read only memory (ROM) and a random access memory (RAM), and a non-volatile storage unit 60C such as a flash memory. In the present embodiment, as an example, the control unit 60 is realized by a field programmable gate array (FPGA) 62 (refer to FIGS. 3 and 6). The CPU 60A controls the overall operation of the radiation detector 40.

In the control unit 60 of the present embodiment, the CPU 60A performs various kinds of correction, such as offset correction and gain correction, on image data indicating a radiographic image input from the signal processing unit 56. In the case of performing offset correction, in the control unit 60 of the present embodiment, the CPU 60A performs offset correction processing by executing a control program for offset correction processing stored in the ROM 60B in advance. In the offset correction processing, first, the control unit 60 causes electric charges accumulated in each of the plurality of pixels 44 of the radiation detector 40 to be read out from each of the plurality of pixels 44 in a state in which the radiation R is not emitted from the radiation emission unit 14, and acquires the offset data from the signal processing unit 56. Then, the control unit 60 causes electric charges accumulated in each of the plurality of pixels 44 of the radiation detector 40 to be read out from each of the plurality of pixels 44 in a state in which the radiation R is emitted from the radiation emission unit 14, and acquires the image data from the signal processing unit 56. The acquired image data is corrected with the offset data.

In the radiographic image capturing apparatus 10 of the present embodiment, a communication unit 64 is housed inside the housing unit 12, the communication unit 64 is connected to the control unit 60, and various kinds of information including image data of radiographic images are transmitted and received to and from an external device such as a console (not shown) through the I/F unit 31 by using at least one of wireless communication or wired communication.

Figure 3:
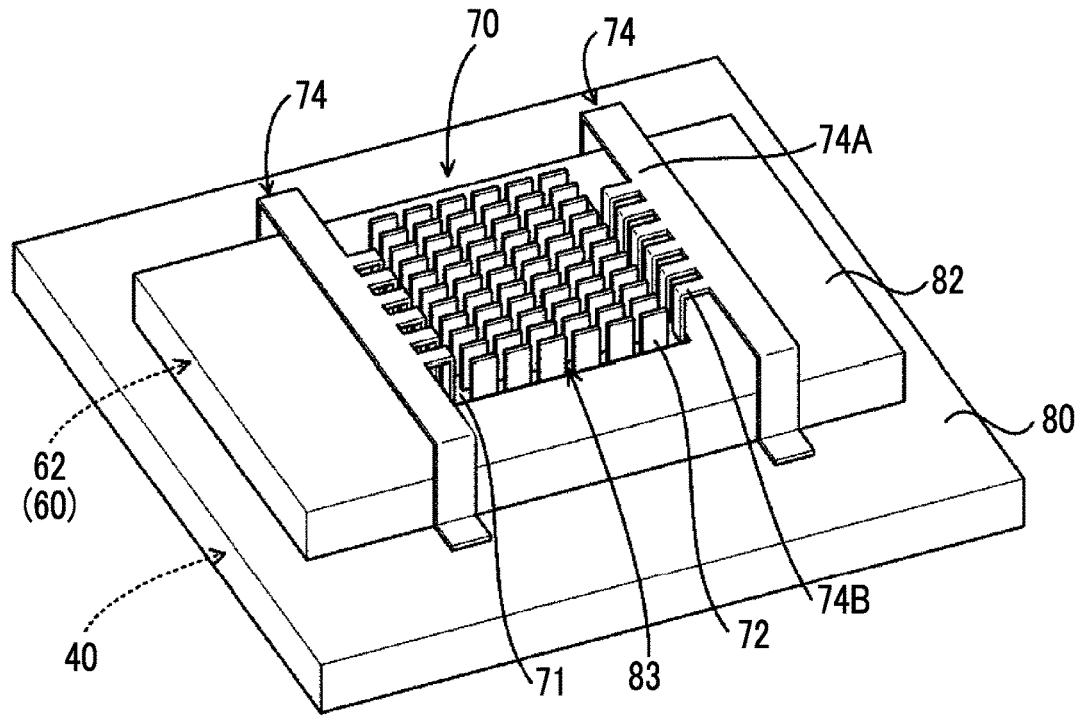
FIG. 3 is a perspective view showing an example of a radiation detector and a control unit housed in a housing unit in the embodiment.
Figure 4:
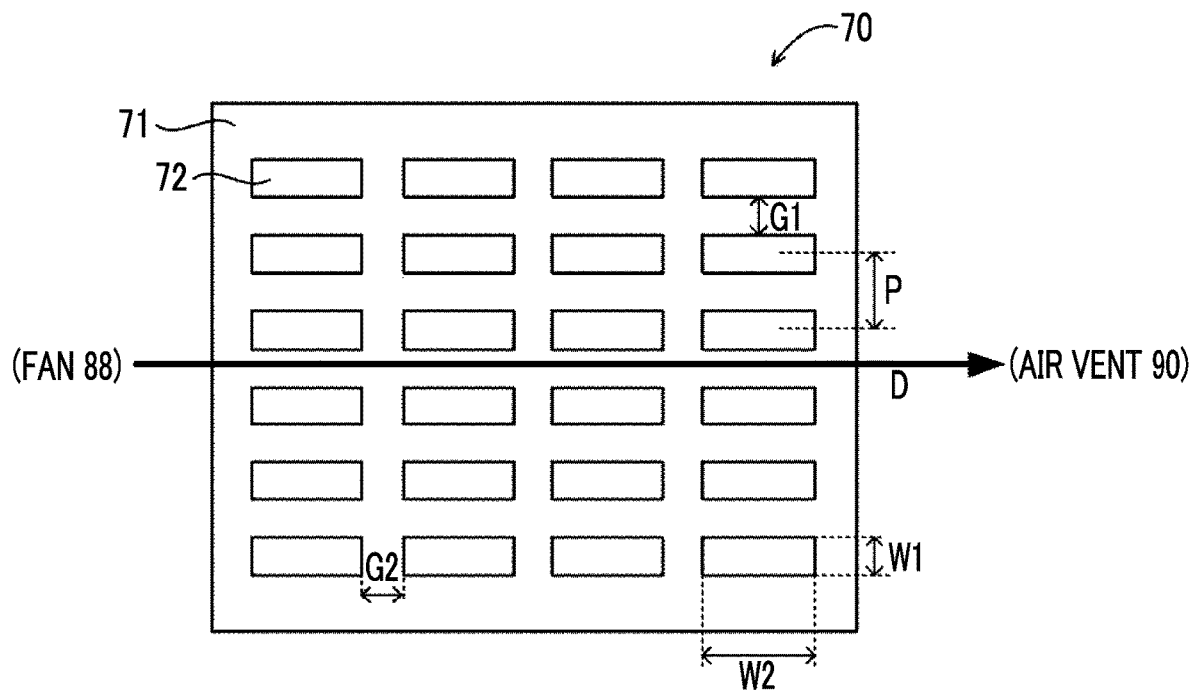
FIG. 4 is a plan view showing an example of a state in which a heat sink of the embodiment is viewed from a side to which fins protrude.
Figure 5:
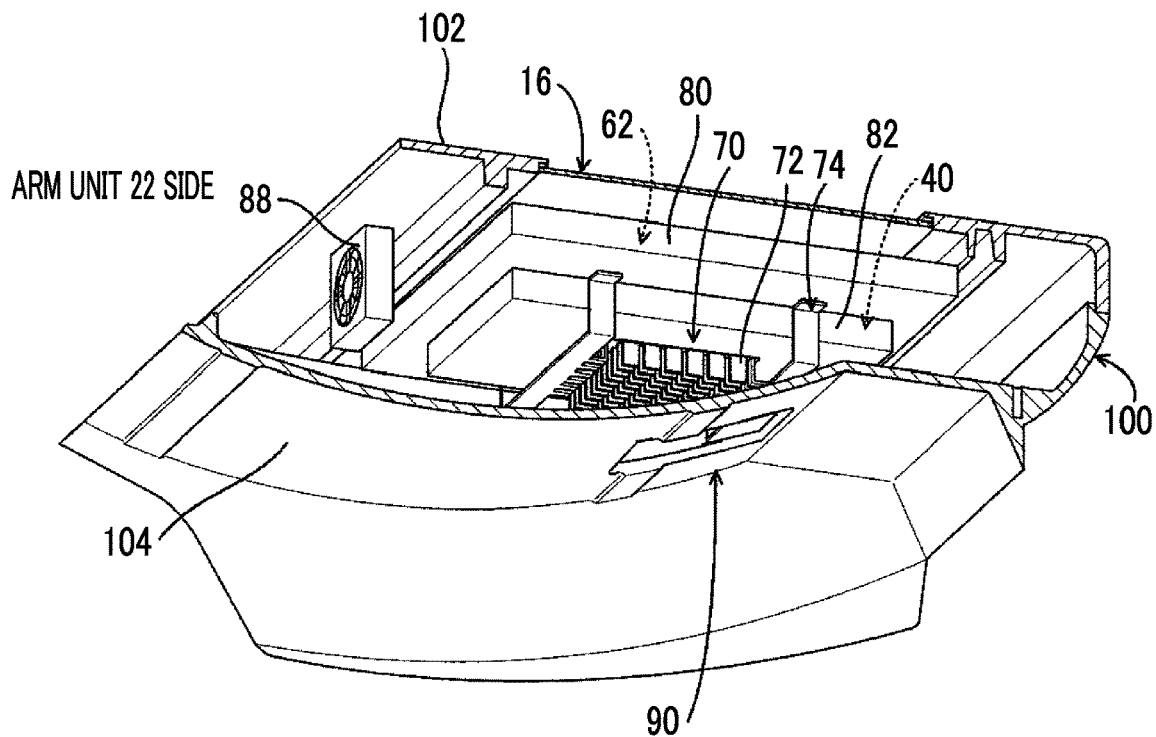
FIG. 5 is a cross-sectional view showing an example of a housing state in which a radiation detector and an FPGA unitized as shown in FIG. 3 are housed inside the housing unit.
Figure 6:
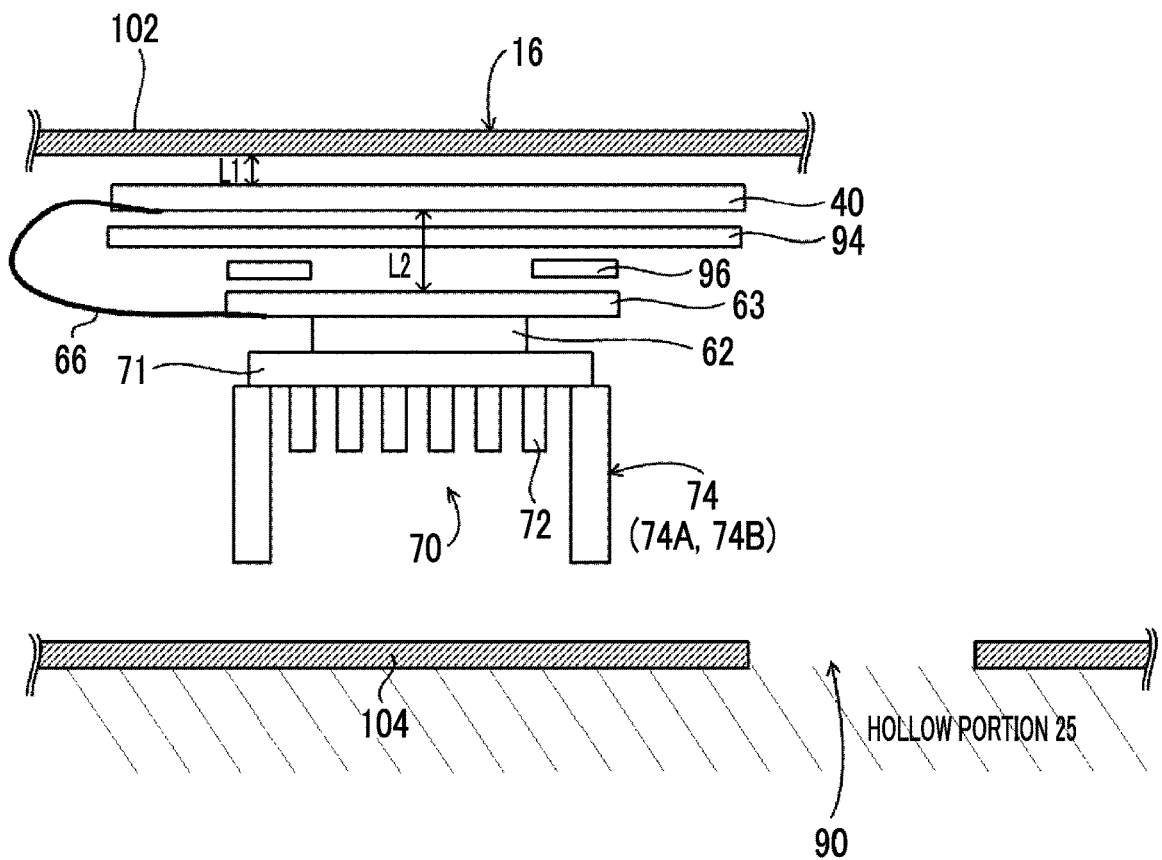
FIG. 6 is a cross-sectional view illustrating a configuration and a method for dissipating heat inside the housing unit in the example of the housing state shown in FIG. 5.
Figure 7:
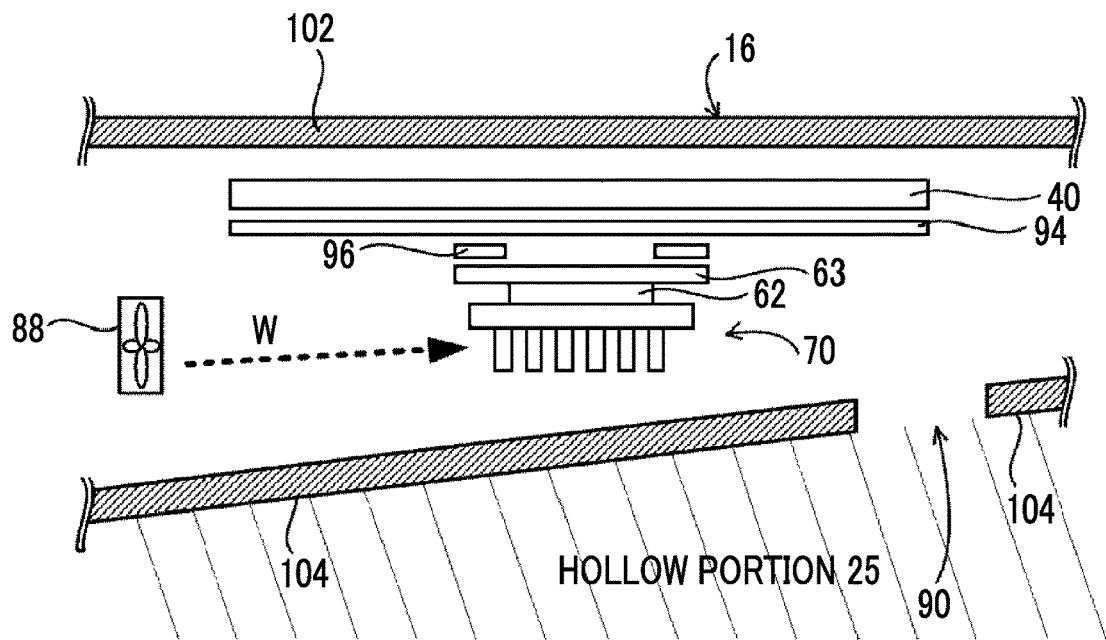
FIG. 7 is a cross-sectional view illustrating the configuration and the method for dissipating heat inside the housing unit in the example of the housing state shown in FIG. 5.

FIG. 3 is a perspective view of an example of the radiation detector 40 and the FPGA 62 housed in the housing unit 12 of the present embodiment. FIG. 4 is a plan view showing an example of a state in which a heat sink 70 is viewed from a side where fins 72 protrude. FIG. 5 is a cross-sectional view showing an example of a housing state in which the radiation detector 40 and the FPGA 62 unitized as shown in FIG. 3 are housed inside the housing unit 12. FIGS. 6 and 7 are cross-sectional views illustrating a configuration and a method for dissipating heat inside the housing unit 12 in the example of the housing state shown in FIG. 5. In FIG. 6, in order to avoid confusion, a heat conduction member 74 is simplified by omitting the individual shapes of a main body unit 74A and a contact unit 74B.

The radiation detector 40 of the present embodiment is covered with a housing 80 together with the gate wiring driver 54 and the signal processing unit 56. The FPGA 62 of the present embodiment is mounted on a substrate 63 (refer to FIG. 6), and is covered with a housing 82 having an opening portion 83 together with the substrate 63. In the present embodiment, the radiation detector 40 and the FPGA 62 are unitized by integrally covering the radiation detector 40 and the FPGA 62 by combining the housing 80 and the housing 82. Without being limited to the present embodiment, for example, the radiation detector 40 and the FPGA 62 may be unitized by being integrally covered with one housing.

Each of the housing 80 and the housing 82 of the present embodiment has a function as a frame ground, and has a function as a measure against electro magnetic compatibility (EMC) in the TFT substrate 42 or the FPGA 62. Thus, in the radiographic image capturing apparatus 10 of the present embodiment, the radiation detector 40 and the FPGA 62 are unitized to take a measure against EMC.

The heat sink 70 is provided on the surface of the FPGA 62 mounted on the substrate 63. Since the heat sink 70 has a function of dissipating heat generated in the FPGA 62, it is preferable that the heat sink 70 is provided near the FPGA 62. In the present embodiment, as an example, the heat sink 70 is pressed against the FPGA 62 by an elastic member (not shown), such as a spring provided between the heat sink 70 and the substrate 63.

As shown in FIGS. 3 and 4, in the heat sink 70 of the present embodiment, a plurality of flat plate shaped fins 72 are provided on a base 71 having a rectangular shape in a plan view. For the sake of convenience of illustration, the number of fins 72 provided in the heat sink 70 in FIG. 3 is different from that in FIG. 4, but it is needless to say that the numbers are the same in practice. The number of fins 72 is arbitrary according to the size of the heat sink 70, the shape of the fin 72, the desired amount of heat dissipation (amount of heat diffusion), or the like, and is not particularly limited. The fin 72 of the present embodiment is an example of a guiding unit of the disclosed technology. An arrow D direction shown in FIG. 4 is an example of a predetermined guiding direction of the disclosed technology, and is hereinafter referred to as a "guiding direction D".

The fin 72 protrudes from the opening portion 83 of the housing 82 toward the outside of the housing 82. As shown in FIGS. 3 and 4, in the present embodiment, the fin 72 is made to have a flat plate shape in which a width W2 along the guiding direction D is larger than a width W1 along a direction perpendicular to the guiding direction D, so that the air flow flows easily in the guiding direction D. The ratio between the width W1 and the width W2 is not particularly limited. However, as the width W2 becomes larger than the width W1, the air flow is more easily guided in the guiding direction D. A gap G1 and a pitch P between the fins 72 influence the ease of guidance of the air flow in the guiding direction D, and the air flow is more easily guided in the guiding direction D as the gap G1 becomes larger. The gap G1 of the present embodiment is an example of a gap of the disclosed technology.

On the other hand, in order to enhance the heat dissipation performance and enhance the heat diffusion effect, it is preferable to make the total surface area of a plurality of fins 72 in the heat sink 70 as wide as possible. However, as the gap G1 increases, the total surface area of the plurality of fins 72 tends to decrease. On the other hand, as the gap G2 increases, the air flow tends to be guided in a direction crossing the guiding direction D. For this reason, it is preferable that the gap G2 is short from the viewpoint of guiding the air flow. In addition, there is a case where the heat dissipation effect decreases as the width W2 increases.

As the wind force of an air blow W by a fan 88 becomes strong, the gap G1 can be made smaller. However, in the case of increasing the wind force of the air blow W, the rotation speed of the fan 88 should be increased. Accordingly, since vibration or the like occurring due to the driving of the fan 88 affects a captured radiographic image as noise, the quality of the radiographic image may be lowered. The driving sound of the fan 88 may be noise.

Therefore, it is preferable to set the ratio between the width W1 and the width W2 or the gaps G1 and G2 according to the wind force of the fan 88, heat dissipation performance, and the like. According to the investigation of the inventors in the case of using various kinds of commonly used heat sinks, the gap G1 is preferably 1.3 mm or more and 4.0 mm or less. In a case where the gap G1 is less than 1.3 mm, the pressure loss of the wind force is large. As a result, the amount of air blow W passing through the fin 72 may be insufficient. On the other hand, in a case where the gap G1 exceeds 4.0 mm, the total surface area of the plurality of fins 72 becomes too small. As a result, since the amount of heat dissipated by the heat sink 70 decreases and heat diffusion (heat transfer) becomes insufficient, temperature unevenness may occur.

In the radiographic image capturing apparatus 10 of the present embodiment, a case will be described in which heat is diffused by dissipating heat mainly due to the FPGA 62, as heat generated inside the housing unit 12, using the heat sink 70.

As shown in FIG. 3, a pair of heat conduction members 74 are provided along a pair of opposite sides of the heat sink 70. From the viewpoint of heat conductivity or strength, the heat conduction member 74 is preferably metal such as aluminum, copper, brass, and iron, or an alloy thereof.

As shown in FIGS. 3 and 6, the heat conduction member 74 of the present embodiment has the main body unit 74A and the contact unit 74B. As shown in FIGS. 3 and 5 as an example, in the heat conduction member 74 of the present embodiment, the main body unit 74A is formed by a member that has bent portions each having an L shape in a cross-sectional view at both end portions and that has a long and flat plate shape as a whole. In the heat conduction member 74 of the present embodiment, the contact unit 74B is formed by a plurality of members each of which protrudes from an intermediate portion of the main body unit 74A and has a crank shape in a cross-sectional view.

The heat conduction member 74 of the present embodiment is manufactured by integrally cutting out the main body unit 74A and the contact unit 74B from a single flat plate shaped member and performing bending processing. However, the invention is not limited to this method. For example, it goes without saying that the heat conduction member 74 may be manufactured by separately manufacturing the main body unit 74A and the contact unit 74B and bonding these to each other.

The terminal end portion of the contact unit 74B of the heat conduction member 74 is in contact with the base 71 of the heat sink 70, and the heat held in the heat sink 70 is transferred to the main body unit 74A by the contact unit 74B. In the present embodiment, a form has been described in which the terminal end portion of the contact unit 74B is in contact with the base 71. However, the invention is not limited to the form, heat may be transferred from the base 71 to the contact unit 74B. For example, the terminal end portion of the contact unit 74B and the base 71 may be spaced apart from each other at positions close to each other.

On the other hand, the main body unit 74A of the heat conduction member 74 has both end portions electrically connected to the housing 80 across the housing 82. In this manner, since the heat conduction member 74 is electrically connected to the housing 80, the heat conduction member 74 has a function as a measure against EMC.

The main body unit 74A of the present embodiment protrudes to the outside of the fins 72 of the heat sink 70 (specifically, to the side of an air vent 90 that will be described in detail later). In this manner, since the main body unit 74A of the heat conduction member 74 protrudes to the air vent 90 side rather than the fins 72 of the heat sink 70, it is possible to suppress the contact of the fins 72 with a bottom plate 104 or the like. Therefore, it is possible to prevent the external impact from being transmitted to the FPGA 62 or the radiation detector 40 through the fins 72 or the heat sink 70.

As shown in FIG. 5, the housing unit 12 of the present embodiment includes a top plate 102 having the radiation detection surface 16 and a housing 100 having the bottom plate 104. The air vent 90 is provided in the bottom plate 104 of the present embodiment. In the present embodiment, as described above, the hollow portion 25 is provided inside each of the holding unit 24 and the arm unit 22, and the inside of each of the hollow portion 25 and the housing unit 12 forms a continuous space through the air vent 90. In the present embodiment, the "continuous space" refers to a space that can be regarded as one space from the viewpoint of transferring (dissipating) the heat inside the housing unit 12. In the present embodiment, the "continuous space" is a space that is a thermodynamically closed system (space where heat moves but substances do not move). In addition, the "continuous space" may not be completely closed, but is preferably a space into which at least a body fluid such as blood, moisture, and the like do not permeate.

As shown in FIGS. 5 to 7, the radiation detector 40 and the FPGA 62 that are unitized are housed in the housing unit 12 in a state in which the radiation detector 40 (housing 80) is located on the radiation detection surface 16 side (top plate 102 side) and the heat sink 70 is located on the bottom plate 104 side. In the present embodiment, as shown in FIGS. 5 to 7 as an example, the air vent 90 is provided on a side opposite to the arm unit 22 side of the bottom plate 104.

Incidentally, as a distance L1 between the radiation detector 40 and the radiation detection surface 16 increases, the radiographic image captured by the radiation detector 40 becomes blurred. Accordingly, the image quality is lowered. For this reason, it is preferable that the distance L1 between the radiation detector 40 and the radiation detection surface 16 is as short as possible. In the radiographic image capturing apparatus 10 of the present embodiment, as shown in FIG. 6 as an example, the radiation detector 40 and the FPGA 62 are connected to each other by a flexible cable 66. However, as a distance L2 between the radiation detector 40 and the FPGA 62 increases, the influence of noise increases. Accordingly, the quality of the radiographic image captured by the radiation detector 40 is lowered. For this reason, it is preferable that the distance L2 between the radiation detector 40 and the FPGA 62 is also as short as possible. In this case, however, the heat of the FPGA 62 is easily transferred to the radiation detector 40.

Therefore, as shown in FIGS. 6 and 7 as an example, the radiographic image capturing apparatus 10 of the present embodiment includes a low heat conduction member 94, which is for suppressing the transfer of the heat of the FPGA 62 to the radiation detector 40, between the radiation detector 40 and the substrate 63. The low heat conduction member 94 is a member having a lower heat conductivity than a predetermined heat conductivity from the viewpoint of suppressing the heat transfer of the FPGA 62. The low heat conduction member 94 is not particularly limited, but is preferably, for example, a polycarbonate (PC) resin or an acrylonitrile butadiene styrene copolymer (ABS) resin. For the low heat conduction member 94, it is preferable that the heat conductivity measured according to JIS A 1412-1 (method for measuring the heat resistance and the heat conductivity of a heat insulating material) is about 0.19 W/mK in a case where the PC resin is used and is within a range of about 0.19 W/mK or more and 0.36 W/mK or less in a case where the ABS resin is used.

In addition, as shown in FIG. 6 and FIG. 7 as an example, the radiographic image capturing apparatus 10 of the present embodiment includes a heat diffusion member 96 for diffusing heat transmitted through the low heat conduction member 94 near the low heat conduction member 94, specifically, between the substrate 63 and the FPGA 62.

As described above, the low heat conduction member 94 suppresses the heat transfer of the FPGA 62. However, complete heat insulation is not realized in many cases. Therefore, in the radiographic image capturing apparatus 10 of the present embodiment, the heat transmitted through the low heat conduction member 94 is diffused by the heat diffusion member 96. By diffusing the heat transmitted through the low heat conduction member 94 using the heat diffusion member 96, unevenness of heat transferred to the radiation detector 40 through the low heat conduction member 94 in a plane in which the pixels 44 of the radiation detector 40 are arranged in a two-dimensional manner is suppressed. Accordingly, it is possible to make the temperature distribution uniform in the plane.

The heat diffusion member 96 is not particularly limited, but is preferably a member having a higher heat conductivity than the low heat conduction member 94. For example, an aluminum foil and an aluminum tape can be mentioned. The heat conductivity of aluminum measured according to JIS A 1412-1 (method for measuring the heat resistance and the heat conductivity of a heat insulating material) is 226 W/mK.

In the radiographic image capturing apparatus 10 of the present embodiment, as shown in FIGS. 5 and 7 as an example, the fan 88 for blowing the inside air from the inside of the housing unit 12 to the fins 72 of the heat sink 70 is provided on the arm unit 22 side inside the housing unit 12. In the radiographic image capturing apparatus 10 of the present embodiment, the air blow W of the fan 88 is discharged from the inside of the housing unit 12 to the outside of the housing unit 12 through the air vent 90. A direction in which the air blow W of the fan 88 in the radiographic image capturing apparatus 10 of the present embodiment is guided to the air vent 90 is the guiding direction D. In the present embodiment, the "inside air" refers to gas inside the housing unit 12 (in the present embodiment, air as an example).

In the radiographic image capturing apparatus 10 of the present embodiment, as an example, control to drive the fan 88 according to the imaging instruction received through the I/F unit 31 is performed. Specifically, the fan 88 is driven according to the timing at which the FPGA 62 is driven. The fan 88 of the present embodiment is an example of an air blower of the disclosed technology. In FIG. 7, for the sake of simplicity, the description of the heat conduction member 74 is omitted.

As shown in FIGS. 5 and 7 as an example, the bottom plate 104 of the housing unit 12 of the present embodiment is inclined from the arm unit 22 side where the fan 88 is provided toward the distal end portion, and the distance between the top plate 102 and the bottom plate 104 gradually decreases toward the distal end portion. The bottom plate 104 of the present embodiment is gently curved from the arm unit 22 side toward the distal end portion as shown in FIG. 5 as an example. By forming the bottom plate 104 in this manner, an air blow W by the fan 88 easily passes through the air vent 90 through the region of the fins 72 of the heat sink 70.

Next, an operation of the radiographic image capturing apparatus 10 of the present embodiment will be described.

As described above, the C arm 20 of the radiographic image capturing apparatus 10 of the present embodiment can rotate with the spindle 29 as a rotation axis, and can move in the arrow A direction shown in FIG. 1. Therefore, in the present embodiment, the angle of the housing unit 12 with respect to the arrow Z direction shown in FIG. 1 changes. That is, the angles of the radiation detector 40, the FPGA 62, and the heat sink 70 with respect to the arrow Z direction shown in FIG. 1 change. In the following description, the upper side in the arrow Z direction shown in FIG. 1 is simply referred to as "upper side" and the lower side in the arrow Z direction is simply referred to as "lower side".

Figure 8:
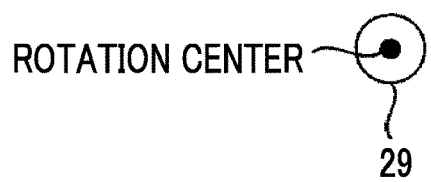
FIG. 8 is an explanatory diagram illustrating heat dissipation in a general closed system.
Figure 8:
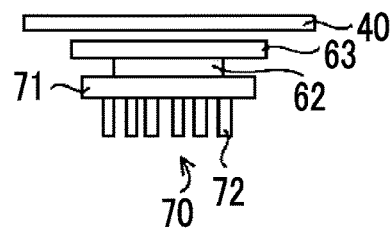

FIG. 8 schematically shows a state of the radiation detector 40, the FPGA 62, and the heat sink 70 in a case where the radiation emission unit 14 is located on the upper side of the radiographic image capturing apparatus 10 and the housing unit 12 is located on the lower side (refer to FIGS. 5 to 7).

In the state shown in FIG. 8, as described above, the air blow W of the fan 88 is discharged to the outside from the air vent 90 through the fins 72 of the heat sink 70.

Although not shown, also in a case where the housing unit 12 is located on the upper side of the radiographic image capturing apparatus 10 and the radiation emission unit 14 is located on the lower side (refer to FIG. 1), the air blow W of the fan 88 is discharged to the outside from the air vent 90 through the fins 72 of the heat sink 70 in the same manner as described above.

Figure 9A:
FIG. 9A is an explanatory diagram schematically showing a state of a radiation detector, an FPGA, and a heat sink in a case where a C arm is rotated by 90° from the state shown in FIG. 8 with a spindle as a rotation axis.
Figure 9A:
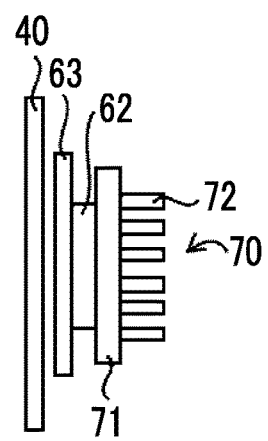
Figure 9B:
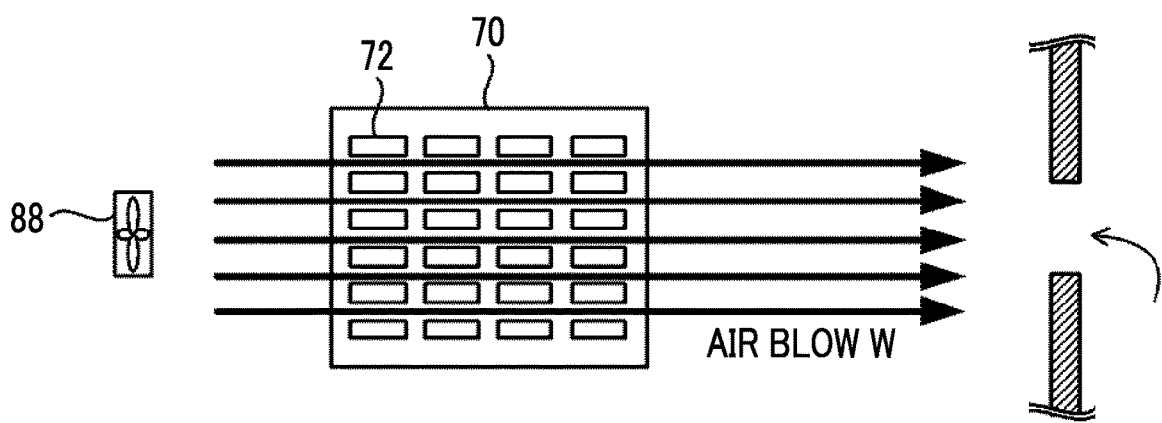
FIG. 9B is an explanatory diagram schematically showing a state of a fan, a heat sink, and an air vent viewed from the bottom plate side in the state shown in FIG. 9A.

On the other hand, FIG. 9A schematically shows a state of the radiation detector 40, the FPGA 62, and the heat sink 70 in a case where the C arm 20 is rotated by 90° from the state shown in FIG. 8 with the spindle 29 as a rotation axis. FIG. 9B schematically shows a state of the fan 88, the heat sink 70, and the air vent 90 viewed from the bottom plate 104 side in the state shown in FIG. 9A.

In the radiographic image capturing apparatus 10 of the present embodiment, the fins 72 of the heat sink 70 guide the air blow W (air flow) to the air vent 90 (in the guiding direction D). Therefore, even in the state shown in FIG. 9A, as shown in FIG. 9B, the air blow W of the fan 88 is guided by the fins 72 of the heat sink 70 and is discharged to the outside from the air vent 90.

As a comparative example, a case will be described in which the fins 72 of the heat sink 70 do not guide the air blow W (air flow) to the air vent 90 (in the guiding direction D) unlike in the radiographic image capturing apparatus 10 of the present embodiment.

Figure 10A:
FIG. 10A is an explanatory diagram schematically showing a state of the radiation detector, the FPGA, and the heat sink in a case where the C arm is rotated by 90° with the spindle as a rotation axis in a comparative example.
Figure 10A:
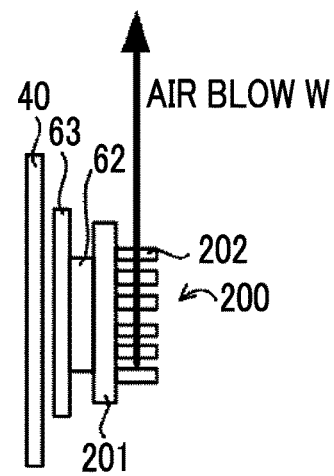
Figure 10B:
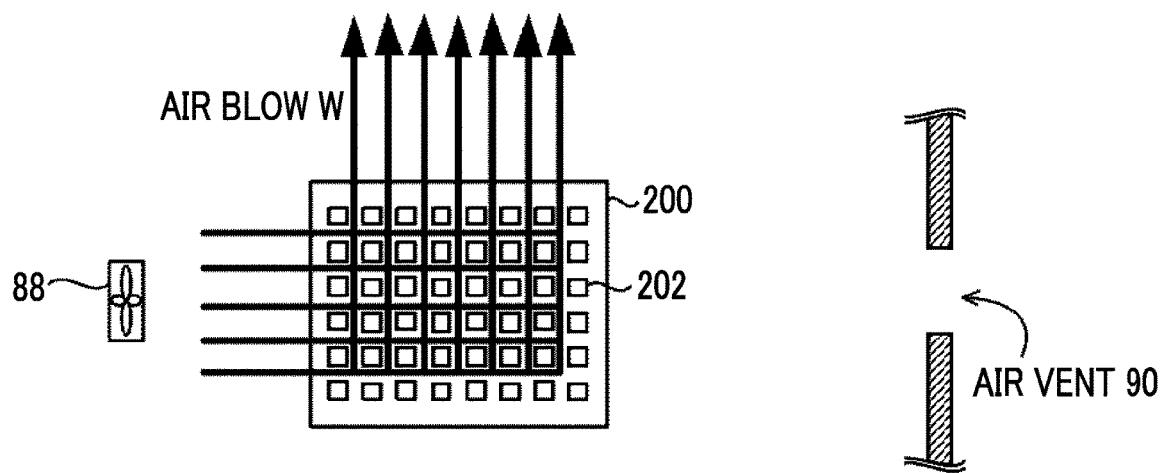
FIG. 10B is an explanatory diagram schematically showing a state of a fan, a heat sink, and an air vent viewed from the bottom plate side in the state shown in FIG. 10A.

As an example, a comparative example in the case of using a heat sink 200, in which a plurality of pin (needle)-like fins 202 are provided on a base 201 of the present embodiment, will be described with reference to FIGS. 10A and 10B. FIG. 10A schematically shows a state of the radiation detector 40, the FPGA 62, and the heat sink 200 in a case where the C arm 20 is rotated by 90° with the spindle 29 as a rotation axis similarly to FIG. 9A. FIG. 10B schematically shows a state of the fan 88, the heat sink 200, and the air vent 90 viewed from the bottom plate 104 side in the state shown in FIG. 10A.

As shown in FIGS. 10A and 10B, in a case where a plurality of pin (needle)-like fins 202 are provided, the air blow W passing through the fins 202 becomes warm. As a result, the air blow W rises as an ascending air flow. For this reason, as shown in FIG. 10B, the air blow W does not reach the air vent 90, but collides with the inner wall of the housing unit 12 and is not exhausted to the outside. In this case, since the housing unit 12 is filled with hot air, the heat of the FPGA 62 is hardly diffused.

As described above, the radiographic image capturing apparatus 10 of the present embodiment includes: the radiation detector 40 in which a plurality of pixels 44 for accumulating electric charges corresponding to the emitted radiation R are arranged in a two-dimensional manner; the FPGA 62 that is the control unit 60 for controlling the radiation detector 40; the radiation emission unit 14 that emits the radiation R; the C arm 20 that integrally changes the angles of the radiation detector 40 and the FPGA 62 with respect to the vertical direction that is an example of the predetermined direction; the heat sink 70 in which the fins 72 for guiding the air flow in the predetermined guiding direction D are provided to dissipate heat of the FPGA 62; and the housing unit 12 in which the radiation detector 40, the FPGA 62, and the heat sink 70 are housed and which has the radiation detection surface 16 irradiated with the radiation R emitted from the radiation emission unit 14.

As described above, according to the radiographic image capturing apparatus 10 of the present embodiment, since the heat of the FPGA 62 that is transferred to the radiation detector 40 through the heat sink 70 is diffused by the guided air flow, the temperature gradient on the two-dimensional plane where the pixels 44 of the radiation detector 40 are provided is suppressed. Therefore, according to the radiographic image capturing apparatus 10 of the present embodiment, it is possible to reduce temperature unevenness.

In the radiographic image capturing apparatus 10 of the present embodiment, it is preferable that the heat sink 70 and the FPGA 62 are close to each other, but the distance between the heat sink 70 and the air vent 90 may be relatively long. In contrast, in the radiographic image capturing apparatus 10 of the present embodiment, as shown in FIG. 6 as an example, since the main body unit 74A of the heat conduction member 74 protrudes toward the air vent 90, heat inside the housing unit 12 can be easily dissipated from the air vent 90 to the hollow portion 25 inside the holding unit 24 through the main body unit 74A.

In the present embodiment, the form in which the radiation detector 40 and the FPGA 62 are unitized has been described. However, the invention is not limited to the form, and the radiation detector 40 and the FPGA 62 may not be unitized.

Although the case where the heat conduction member 74 is in contact with the heat sink 70 has been described in the present embodiment, it is preferable that the heat conduction member 74 is in contact with at least one of the FPGA 62 or the heat sink 70. However, as long as heat is transferred from the heat sink 70 or the FPGA 62, the heat conduction member 74 may be in contact with neither the heat sink 70 nor the FPGA 62.

Figure 11:
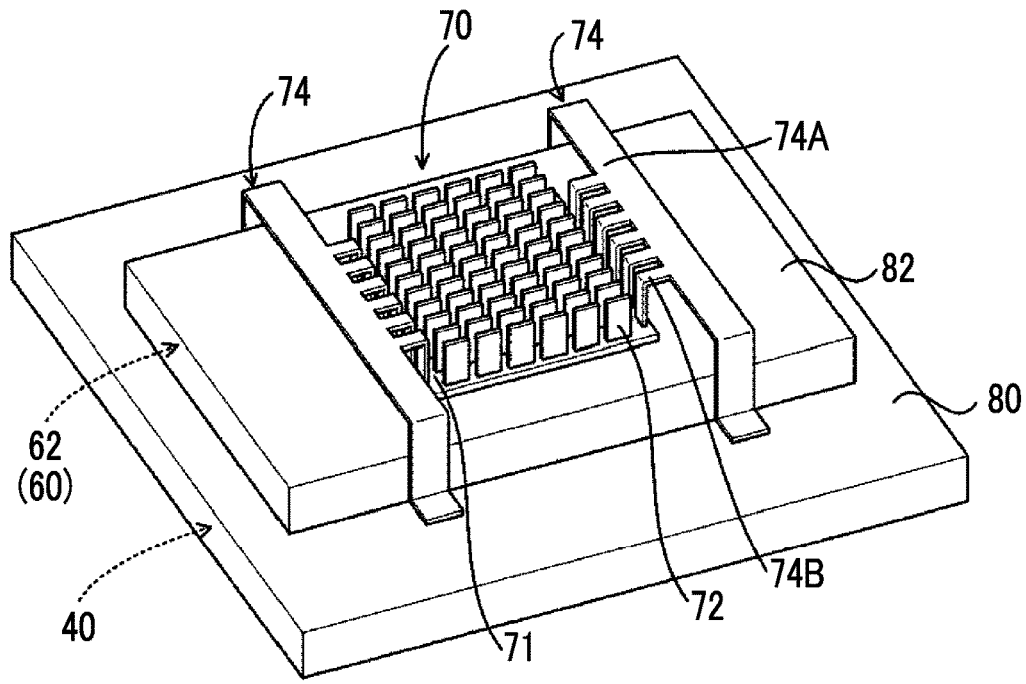
FIG. 11 is a perspective view showing another example of the radiation detector and the control unit housed in the housing unit of the embodiment.

In the present embodiment, the form has been described in which the heat sink 70 is provided on the surface of the FPGA 62 and a part of the base 71 of the heat sink 70 is covered with the housing 82. However, it is needless to say that the invention is not limited to the form. For example, as shown in FIG. 11, the FPGA 62 may be covered with the housing 82 in which the opening portion 83 is not provided, and the heat sink 70 may be provided in a region covering the FPGA 62 of the housing 82.

Figure 12:
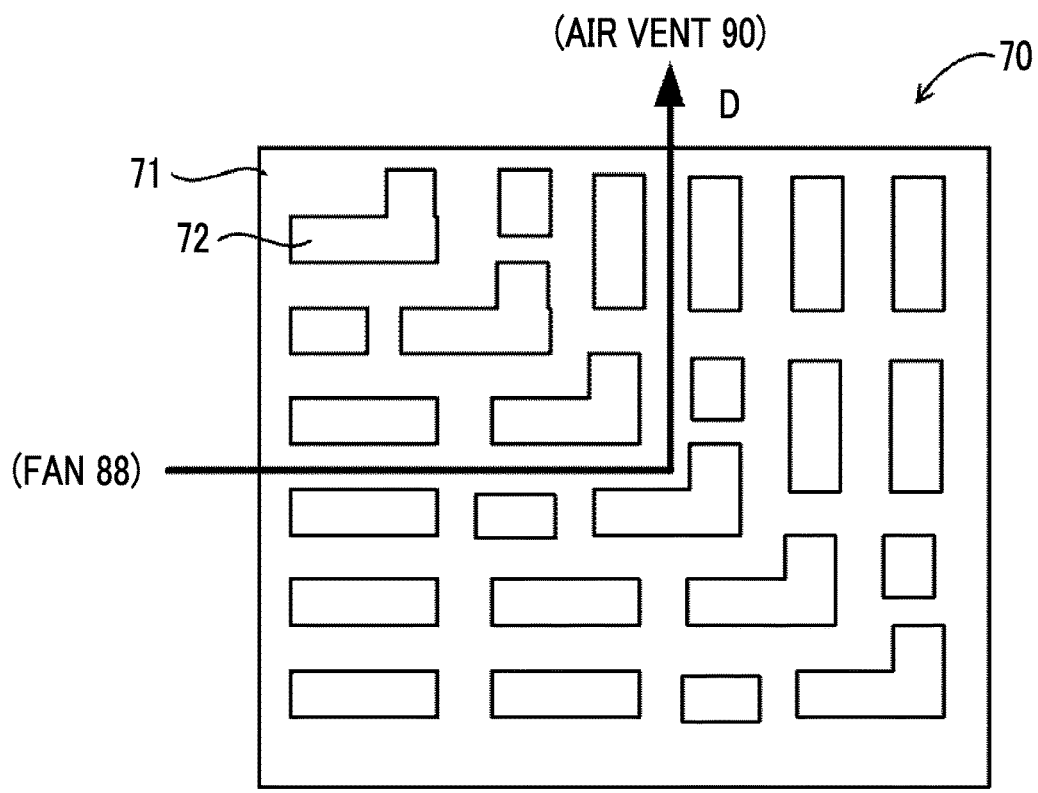
FIG. 12 is a plan view showing another example of the shape and the arrangement of fins.

It is needless to say that the shape, arrangement, and the like of the fins 72 of the heat sink 70 are not limited to the present embodiment, and a form according to the guiding direction of the air flow may be adopted. For example, in a case where the radiographic image capturing apparatus 10 includes the fan 88 and the air vent 90, the shape and the arrangement of the fins 72 may be set according to the positions of the fan 88 and the air vent 90. For example, as shown in FIG. 12, in a case where the fan 88 and the air vent 90 are provided so as to cross each other as viewed from the heat sink 70, it is preferable that at least some of the plurality of fins 72 are bent according to the positions of the fan 88 and the air vent 90. At least one of the fan 88 or the air vent 90 of the present embodiment is an example of a heat dissipation assisting unit of the present disclosure.

In the present embodiment, the form has been described in which the radiographic image capturing apparatus 10 includes one FPGA 62. However, the number of FPGAs 62 provided in the radiographic image capturing apparatus 10 is not particularly limited. For example, a plurality of FPGAs 62 may be provided. In this case, the heat sink 70 may be provided for each of the plurality of FPGAs 62. Alternatively, for the plurality of FPGAs 62, for example, one heat sink 70 covering all of the plurality of FPGAs 62 may be provided.

In the present embodiment, the form has been described in which the inside air of the housing unit 12 is exhausted to the hollow portion 25 of the arm unit 22. However, the destination of the inside air is not limited to the hollow portion 25. For example, the inside air of the housing unit 12 may be exhausted to the outside of the radiographic image capturing apparatus 10.

In addition, it is needless to say that both the size and the shape of the air vent 90 are not limited to the size and the shape described in the present embodiment.

In the present embodiment, the form has been described in which the technique of the present disclosure is applied to the radiographic image capturing apparatus 10 including the C arm 20. However, it is needless to say that the invention is not limited to the radiographic image capturing apparatus 10 of the embodiment. For example, the technique of the present disclosure may also be applied to a so-called X-ray television for observing the inside of the body in real time using the radiation R transmitted through the body or the like.

The configuration, operation, and the like of the radiographic image capturing apparatus 10 described in the above embodiment are examples, and it is needless to say that these can be changed according to the circumstances within the scope not deviating from the spirit of the invention.

What is claimed is:

1. A radiographic image capturing apparatus, comprising:
   a radiation detector in which a plurality of pixels for accumulating electric charges corresponding to emitted radiation are arranged in a two-dimensional manner;
   a control unit that controls the radiation detector;
   a radiation emission unit that emits radiation;
   a changing unit that integrally changes angles of the radiation detector and the control unit with respect to a predetermined direction;
   a heat sink in which a guiding unit for guiding an air flow in a predetermined guiding direction is provided and which dissipates heat of the control unit;
   a housing unit in which the radiation detector, the control unit, and the heat sink are housed and which has a radiation detection surface irradiated with the radiation emitted from the radiation emission unit;
   a low heat conduction member that is provided between the radiation detector and the control unit and has a lower heat conductivity than a predetermined heat conductivity; and
   a heat diffusion member that is provided between the radiation detector and the control unit in a vicinity of the low heat conduction memeber to diffuse heat of the low heat conduction member.

2. The radiographic image capturing apparatus according to claim 1, further comprising:
   a heat dissipation assisting unit that assists heat dissipation of the heat sink,
   wherein the predetermined guiding direction is a heat dissipation direction set in advance according to the heat dissipation assisting unit.

3. The radiographic image capturing apparatus according to claim 2,
   wherein the heat dissipation assisting unit includes an air blower that blows inside air from an inside of the housing unit to the guiding unit.

4. The radiographic image capturing apparatus according to claim 2,
   wherein the heat dissipation assisting unit includes an air vent provided in the housing unit, and
   the predetermined guiding direction is a direction toward the air vent.

5. The radiographic image capturing apparatus according to claim 1,
   wherein the changing unit includes a support unit for supporting the radiation emission unit at a position facing the radiation detection surface.

6. The radiographic image capturing apparatus according to claim 4,
   wherein the changing unit includes a support unit, which supports the radiation emission unit and has a hollow portion forming a space continuous with an inside of the housing unit through the air vent, at a position facing the radiation detection surface.

7. The radiographic image capturing apparatus according to claim 1,
   wherein the heat diffusion member is a member having a higher heat conductivity than the low heat conduction member.

8. The radiographic image capturing apparatus according to claim 1,
   wherein the guiding unit is a plurality of fins aligned with a gap of 1.3 mm or more and 4.0 mm or less.

9. The radiographic image capturing apparatus according to claim 1,
   wherein the control unit acquires an image signal by reading out electric charges accumulated in each of the plurality of pixels from each of the plurality of pixels in a state in which radiation is emitted from the radiation emission unit, acquires offset data by reading out electric charges accumulated in each of the plurality of pixels from each of the plurality of pixels in a state in which no radiation is emitted from the radiation emission unit, and performs correction processing for correcting the image signal with the offset data.

10. A heat diffusion method of a radiographic image capturing apparatus comprising a radiation detector in which a plurality of pixels for accumulating electric charges corresponding to emitted radiation are arranged in a two-dimensional manner, a control unit that controls the radiation detector, a radiation emission unit that emits radiation, a change unit that integrally changes angles of the radiation detector and the control unit with respect to a predetermined direction, a low heat conduction member that is provided between the radiation detector and the control unit and has a lower heat conductivity than a predetermined heat conductivity, a housing unit in which the radiation detector, the control unit, and a heat sink are housed and which has a radiation detection surface irradiated with the radiation emitted from the radiation emission unit, and a heat diffusion member that is provided between the radiation detector and the control unit in a vicinity of the low heat conduction member to diffuse heat of the low heat conduction member, the method comprising:

dissipating heat of the control unit by guiding an air flow in a predetermined guiding direction using a guiding unit provided in the heat sink such that the heat is diffused.

\* \* \* \* \*